(12) United States Patent
Piersol et al.

(10) Patent No.: US 9,191,612 B2
(45) Date of Patent: Nov. 17, 2015

(54) AUTOMATIC ATTACHMENT OF A CAPTURED IMAGE TO A DOCUMENT BASED ON CONTEXT

(75) Inventors: Kurt W. Piersol, Campbell, CA (US); Kanae Amemiya, Cupertino, CA (US); Sergey Chemishkian, Cupertino, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 12/826,578

(22) Filed: Jun. 29, 2010

(65) Prior Publication Data
US 2011/0320935 A1    Dec. 29, 2011

(51) Int. Cl.
| | |
|---|---|
| G06F 17/00 | (2006.01) |
| H04N 5/77 | (2006.01) |
| G06F 17/24 | (2006.01) |
| G11B 27/32 | (2006.01) |
| H04N 5/232 | (2006.01) |
| H04N 21/414 | (2011.01) |
| H04N 21/4223 | (2011.01) |
| H04N 21/472 | (2011.01) |
| H04N 21/4788 | (2011.01) |
| G06T 11/60 | (2006.01) |
| G11B 27/036 | (2006.01) |

(Continued)

(52) U.S. Cl.
CPC ............... *H04N 5/772* (2013.01); *G06F 17/24* (2013.01); *G06F 17/241* (2013.01); *G06T 11/60* (2013.01); *G11B 27/036* (2013.01); *G11B 27/10* (2013.01); *G11B 27/329* (2013.01); *H04N 5/232* (2013.01); *H04N 21/41407* (2013.01); *H04N 21/4223* (2013.01); *H04N 21/4788* (2013.01); *H04N 21/47205* (2013.01); *H04N 9/8205* (2013.01)

(58) Field of Classification Search
CPC ........................................................ G06F 17/24
USPC ........................................................ 715/255
See application file for complete search history.

(56) References Cited

U.S. PATENT DOCUMENTS

| | | | |
|---|---|---|---|
| 7,113,306 B1 | 9/2006 | Nakabayashi et al. | |
| 8,018,518 B2 * | 9/2011 | Nobels | 348/333.02 |

(Continued)

FOREIGN PATENT DOCUMENTS

| | | |
|---|---|---|
| CN | 101147130 | 3/2008 |
| FR | 2842005 | 1/2004 |

(Continued)

OTHER PUBLICATIONS

Zadeh, L.A., "Fuzzy Sets", Department of Electrical Engineering and Electronics Research Laboratory, University of California, Berkeley, California, Information and Control 8, pp. 338-353 (1965).

(Continued)

*Primary Examiner* — Cesar Paula
*Assistant Examiner* — Mohammed-Ibrahim Zuberi
(74) *Attorney, Agent, or Firm* — Patent Law Works LLP

(57) ABSTRACT

A portable computing device for automatic attachment of a captured image to a document being displayed triggered by the act of capturing the image is disclosed. A new page is added to the current document being reviewed and displayed on the portable computing device, and then the image and metadata are attached in that new page. In other variations, the document includes metadata having a location at which images may be stored and upon capture the image, the captured image is stored at the metadata location.

20 Claims, 12 Drawing Sheets

(51) Int. Cl.
*G11B 27/10* (2006.01)
*H04N 9/82* (2006.01)

(56) References Cited

U.S. PATENT DOCUMENTS

| | | | |
|---|---|---|---|
| 2005/0219263 A1* | 10/2005 | Thompson et al. | 345/619 |
| 2006/0114488 A1 | 6/2006 | Motamed | |
| 2006/0148528 A1* | 7/2006 | Jung et al. | 455/566 |
| 2006/0212359 A1 | 9/2006 | Hudgeon | |
| 2006/0218127 A1 | 9/2006 | Tate et al. | |
| 2006/0253478 A1 | 11/2006 | Graham et al. | |
| 2006/0287950 A1 | 12/2006 | Steinbert et al. | |
| 2007/0047781 A1* | 3/2007 | Hull et al. | 382/124 |
| 2007/0226374 A1 | 9/2007 | Quarterman et al. | |
| 2007/0245227 A1* | 10/2007 | Hyland et al. | 715/505 |
| 2008/0030599 A1* | 2/2008 | Stavely et al. | 348/239 |
| 2008/0040162 A1 | 2/2008 | Brice | |
| 2008/0059390 A1 | 3/2008 | Cox et al. | |
| 2008/0129667 A1 | 6/2008 | Zehner et al. | |
| 2009/0012887 A1 | 1/2009 | Taub et al. | |
| 2009/0086945 A1 | 4/2009 | Buchanan et al. | |
| 2009/0094275 A1 | 4/2009 | Patton et al. | |
| 2009/0276531 A1* | 11/2009 | Myka et al. | 709/227 |
| 2010/0107165 A1* | 4/2010 | Koskimies et al. | 718/100 |
| 2010/0179816 A1* | 7/2010 | Wu et al. | 705/1.1 |
| 2010/0179882 A1 | 7/2010 | Rigole | |
| 2010/0239176 A1* | 9/2010 | Yamakado et al. | 382/224 |
| 2011/0010356 A1* | 1/2011 | Berard | 707/707 |
| 2011/0060910 A1 | 3/2011 | Gormish et al. | |
| 2011/0137818 A1 | 6/2011 | Goad et al. | |
| 2011/0145094 A1 | 6/2011 | Dawson et al. | |
| 2011/0231745 A1* | 9/2011 | Levesque et al. | 715/202 |
| 2012/0059676 A1* | 3/2012 | King | 705/4 |
| 2013/0297353 A1* | 11/2013 | Strange et al. | 705/4 |

FOREIGN PATENT DOCUMENTS

| | | |
|---|---|---|
| GB | 2396988 | 7/2004 |
| JP | 08-335214 | 12/1996 |
| JP | 09-325879 | 12/1997 |
| JP | 2000-69304 | 3/2000 |
| JP | 2000-287164 | 10/2000 |
| JP | 2000287164 | 10/2000 |
| JP | 20045700 | 1/2004 |
| JP | 2006-331122 | 12/2006 |
| JP | 2007-257670 | 10/2007 |
| JP | 2007-328489 | 12/2007 |
| JP | 2008-097435 | 4/2008 |
| JP | 2008-524735 | 7/2008 |
| JP | 2008-204469 | 9/2008 |
| JP | 2008537816 | 9/2008 |
| JP | 2009-003596 | 1/2009 |
| JP | 2009-075879 | 4/2009 |
| WO | WO 0063834 | 10/2000 |
| WO | 2005054933 | 6/2005 |
| WO | WO 2006100194 | 9/2006 |

OTHER PUBLICATIONS

Dempster, A.P., "Upper and Lower Probabilities Induced by a Multivalued Mapping", The Annals of Mathematical Statistics, vol. 38, No. 2 (Apr. 1967), pp. 325-339.
Shafer, Glenn, "A Mathematical Theory of Evidence", Princeton University Press, 1976, pp. 1-15.
Zadeh, L.A., "Fuzzy Sets as a Basis for a Theory of Possibility", Fuzzy Sets and Systems 100 Supplement (1999), Computer Science Division, Department of Electrical Engineering and Computer Science and the Electronics Research Laboratory, University of California, Berkeley, CA 94720, USA, pp. 9-34.
PCT Search Report and Written Opinion, PCT Patent Application No. PCT/JP2011/064600, Jun. 20, 2011, 12 pages.
PCT Search Report and Written Opinion, PCT Patent Application No. PCT/JP2011/065128, Jun. 24, 2011, 10 pages.
PCT Search Report and Written Opinion, PCT Patent Application No. PCT/JP2011/065236, Jun. 27, 2011, 11 pages.
Anand, Paul, "Foundations of Rational Choice Under Risk", Clarendon Press, Oxford University Press 1993, pp. 1-11.
PCT Search Report and Written Opinion, PCT Patent Application No. PCT/JP2011/070675, Dec. 6, 2011, 13 pages.
Wu et al. "User-Preference Based Service Selection Using Fuzzy Logic" (2010) CNSM, pp. 342-345 (http://ieeexplore.ieee.org/stamp/stamp.jsp?arnumber=05691228).
United States Office Action, U.S. Appl. No. 12/879,148, Apr. 19, 2012, 28 pages.
United States Office Action, U.S. Appl. No. 12/826,556, Apr. 27, 2012, 23 pages.
European Search Report for PCT Application PCT/JP 2011065236, dated Nov. 15, 2013, 8 pages.
European Examination Report for EU Application No. 11 801 013.1 dated Jun. 24, 2014, 6 pages.
ISO/IEC 2007, Information technology—Multimedia Content Description Interface—Part 8: Extraction and Use of MPEG-7 Descriptions, Amendment 3: Technologies for Digital Photo Management Using MPEG-7 Visual Tools, Dated Jul. 6, 2007, 37 pages.
Philipp Sandhaus et al, "Processes of Photo Book Production", Multimedia Systems (2008), Springer-Veriag 2008, Dated Jul. 16, 2008, 7 pages.

* cited by examiner

AUTOMATIC ATTACHMENT OF A CAPTURED IMAGE TO A DOCUMENT BASED ON CONTEXT

BACKGROUND OF THE INVENTION

1. Field of the Invention

The present embodiment of the invention relates to portable computing devices and electronic documents, and in particular, user interfaces for portable computing device that allow the automatic attachment of a captured image to a document based upon the context of use of the portable computing device.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

One particular problem with such prior devices is that they are difficult to operate and configure especially for the layman or unsophisticated user. For example, these portable computing devices are very similar to desktop computers and have a variety of configuration details such as an input device, output device, communication type, available connections, data synchronization which can make them very difficult to use. Furthermore, many of the devices require a conventional keyboard or some pseudo-simulated type version of the keyboard in which to input data to the portable computing devices. This requires that the users learn a number of different interfaces to interact with portable computing devices. Those interfaces may also change depending on the application that is being run by the portable computing device. Requiring the use of such numerous and different interfaces reduces the usability and convenience of such devices.

Many portable computing devices also include a camera. However, one particular aspect of portable computing devices that is difficult to use is the camera. First, the user often has to change modes in order to operate the camera. This requires that a current application be exited, a new application or camera mode be started, and then settings for the camera input only after which the user is able to take a picture. Second, once a picture has been captured, it is stored on the portable computing device. A number of steps or user interactions with the portable computing device are required to either send the photo or move it to another location. For example, in order to send a picture that has just been taken, the user has to exit the camera mode, enter an application that is going to send the picture, attach the picture to a message, and then send the message. Even when merely copying the picture that has been taken from the portable computing device to a desktop computer requires a number of steps. Typically, the camera must be connected for communication in some manner with a desktop computer. Then the browser or file system must be utilized to locate the picture from a directory that includes the files on the portable computing device. Then the picture must be copied from the portable computing device to a desired location on the desktop computer. Finally, an application must be opened so that the picture can be used or sent (e-mail). Thus, current day portable computing devices make it very difficult to use the camera to capture images and integrate those images into workflows or otherwise transmit those images.

SUMMARY OF THE INVENTION

The present embodiment of the invention overcomes the deficiencies and limitations of the prior art by providing a system for the automatic attachment of a captured image to a document based upon the context of use of the portable computing device. The system of the present embodiment of the invention automatically attaches a captured image to a document being displayed on a portable computing device in response to the capturing of the image. In one embodiment, a new page is added to the current document being reviewed and displayed on the portable computing device, and then the image and metadata are attached in that new page. In another embodiment, the document includes metadata having a location at which images may be stored and upon capture the image, the captured image is stored at the metadata location. This is particularly advantageous because the system automatically recognizes the document being viewed (e.g., the context in which the portable computing device is being operated) and when the user inputs the captured image command, the image is captured and automatically added to that document.

In one embodiment, the portable computing device includes a processor, a display, stroke capture capability, a camera and a wireless communication capability. The portable computing device is adapted to receive documents, add stroke annotations to the received documents, add captured image annotations to the received documents, and send the annotated documents. The portable computing device also includes a presentation module and an automatic capture module. The presentation module is responsible for presenting document pages on the display as well as user interfaces allowing the addition of stroke annotations, the addition of captured images, and other actions to be taken on the documents. The automatic capture module is utilized for the automatic capture of images and addition of the captured images to documents. The automatic capture module advantageously determines a document currently displayed by the portable computing device, and monitors for a capture image signal. Upon detection of the captured image signal, the automatic capture module adds the captured image to the document that was currently being displayed on the portable computing device.

The present embodiment of the invention also includes a novel method for capturing an image and automatically adding it to a document, and a number of novel user interfaces.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
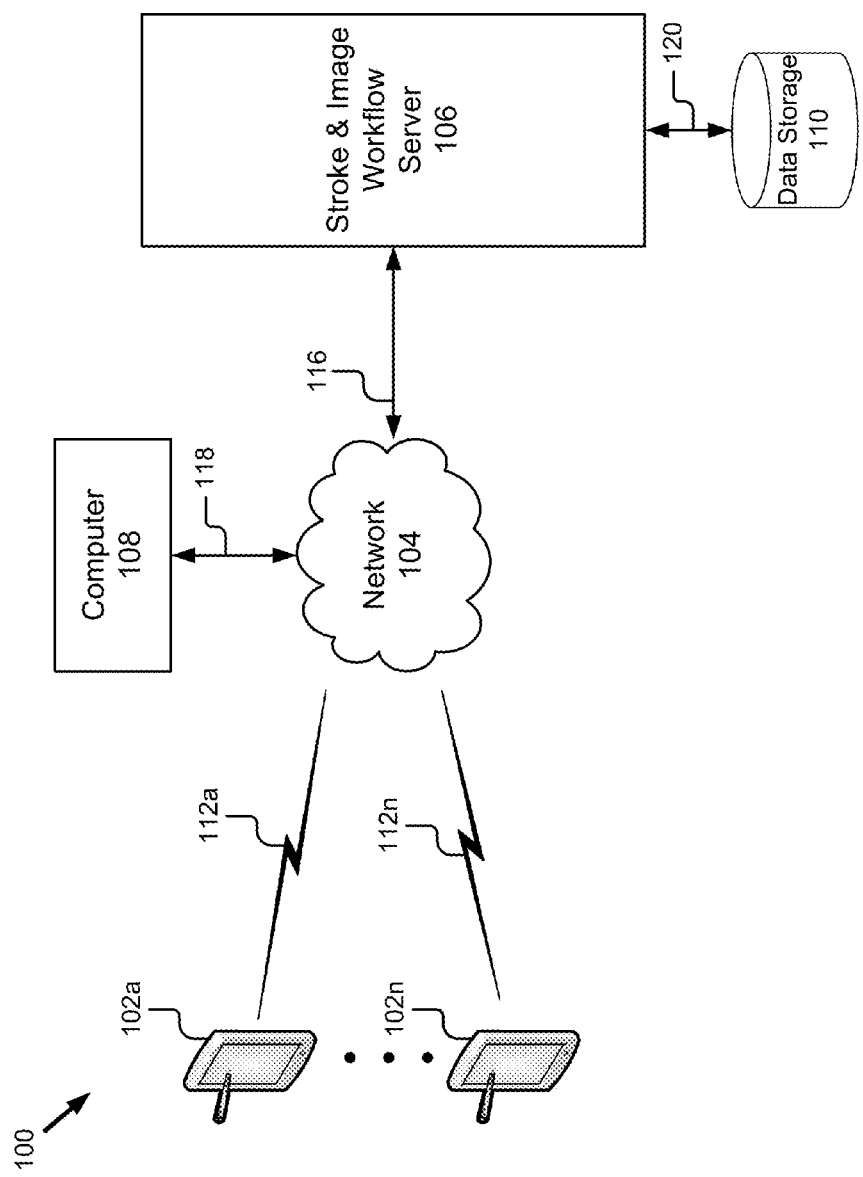
FIG. 1 is a block diagram of an embodiment of a system for automatic attachment of a captured image in accordance with the present embodiment of the invention.

A system for the automatic attachment of a captured image to a document based upon the context of use of the portable computing device is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present embodiment of the invention is described in one embodiment below with reference to portable computing devices that are exemplified in a hardware and software platform like the Amazon Kindle that utilize electronic paper, e-paper or electronic ink display. However, the present embodiment of the invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of the invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of the invention is described with reference to a particular programming language. It will be appreciated that a variety of programming languages may be used to implement the teachings of the invention as described herein.

System Overview

FIG. 1 shows an embodiment of a system 100 for automatic stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices 102a-102n are adapted to receive images (e.g., forms or documents), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer or hardware server. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 430 (See FIG. 4) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 408, a workflow module 412, a logging module 416, and a verification module 430 (See FIG. 4). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. In an alternate embodiment, data storage 10 is coupled to the stroke and image workflow server 106 by the network 104. For example, in such an alternate embodiment, the data storage 110 is an online storage Web service such as Amazon S3. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing device 102a-n may communicate with more than one stroke and image workflow server 106. Particular pages or sections of a document could be associated with different workflow servers. Also, portions of a compound document can be forwarded rather than sending the entire compound document.

Portable Computing Device 102

Figure 2A:
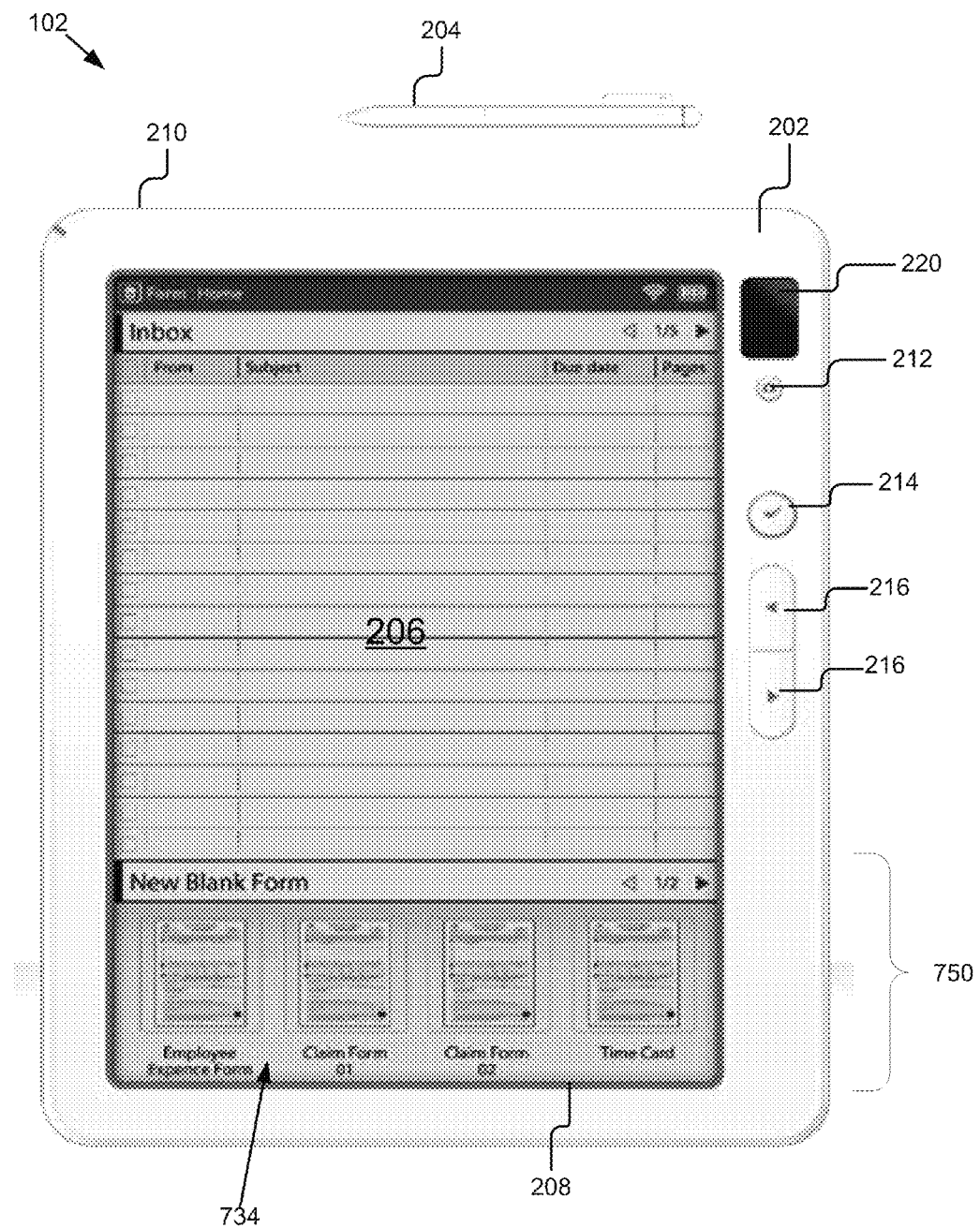
FIG. 2A is a front plan view of an embodiment of a portable computing device in accordance with the present embodiment of the invention.
Figure 2B:
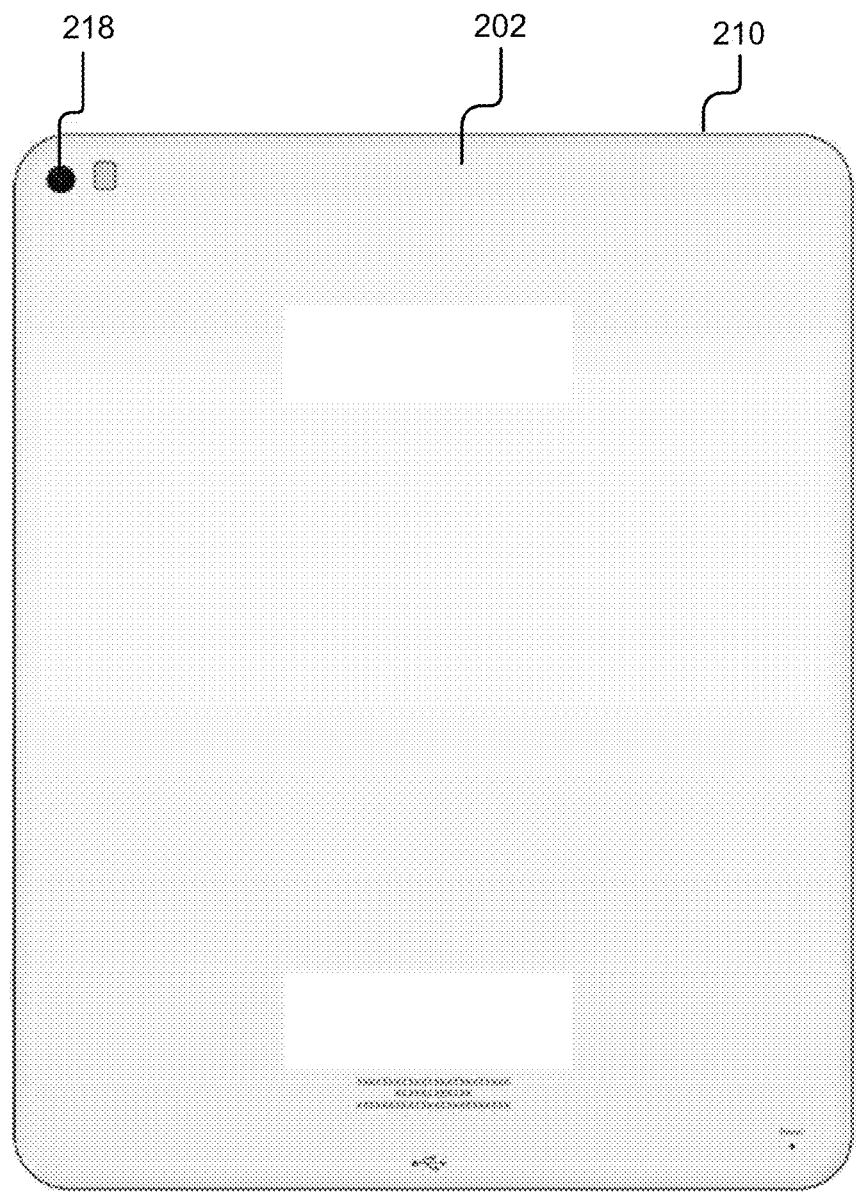
FIG. 2B is a back plan view of the embodiment of a portable computing device of FIG. 2A in accordance with the present embodiment of the invention.
Figure 3:
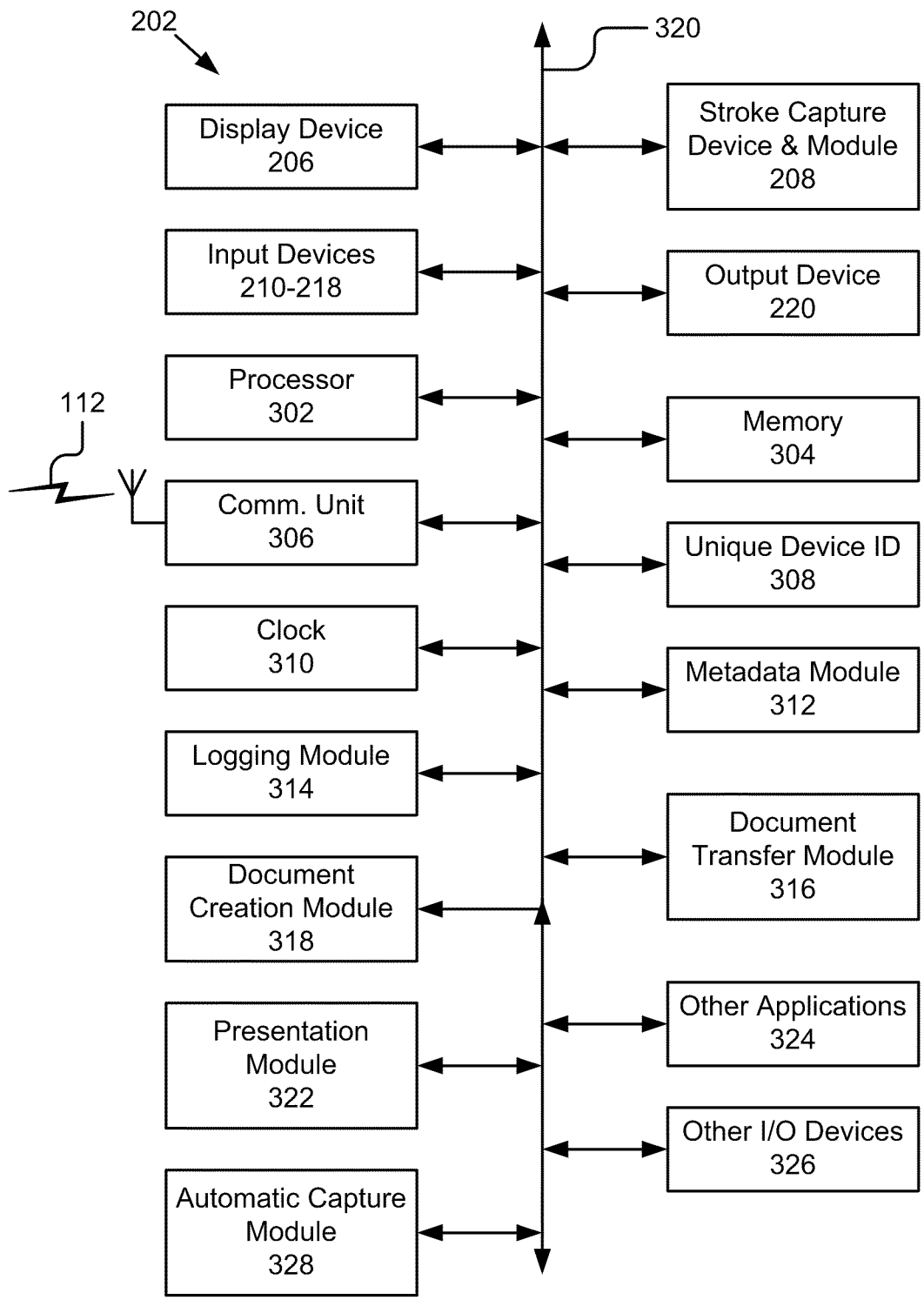
FIG. 3 is a block diagram of the embodiment of the portable computing device in accordance with the present embodiment of the invention.

Referring now to FIGS. 2A, 2B and 3, an embodiment of the portable computing device 102 will be described in more detail. The portable computing device 102 comprises a computing pad 202 and a stylus 204. In an alternate embodiment, the portable computing device 102 may include only a computing pad 202 and users can use their finger or other pen-like object as a stylus. The computing pad 202 displays an image and records any strokes written on the image. The strokes are typically displayed immediately on top of the image, just as if written by pen on paper. The strokes are also typically captured as a sequence of points or segments. Usually some timing information is captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes. In some cases, pen or stylus 204 velocity and/or pen acceleration are also recorded. In some cases other aspects of the pen or stylus 204 such as pen rotation or the angle of the pen to the display surface are recorded.

The computing pad 202 comprises a display device 206, a stroke capture device and module 208, a plurality of input devices 210-216, a camera 218, an output device 220, a processor 302, a memory 304, a communication unit 306, unique device identifier storage 308, a clock 310, a metadata module 312, a logging module 314, a document transfer module 316, a document creation module 318, a bus 320, a presentation module 322, other applications 324, and an automatic capture module 328.

Referring now to FIGS. 2A and 2B, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208.

In addition to the stylus 204, the computing pad 202 provides a plurality of input devices 210-216 to input commands. As shown in FIG. 2A, a first button 210 on the top edge of the computing pad 202 when selected turns the computing pad 202 on and off. In one embodiment, the first button 210 can be selected for a short duration to put the computing pad 20 in sleep mode, and depressed for a longer duration to turn the computing pad 202 off. A second button 212 controls the operation of the camera 218 and when selected causes the camera 218 to capture an image. A third button 214 when selected indicates that annotation of a document is complete and the document should be sent by the computing pad 202. A fourth pair of input buttons 216 allows the user to transition to a next page or previous page, respectively, of a document. Those skilled the art will recognize that these input devices as buttons are merely one embodiment for the plurality of input devices 210-216 and that various other configurations of fewer or more buttons or input devices are within the spirit and scope of the present embodiment of the invention. More specifically, in another embodiment, the computing pad 202 has very few (or no) buttons because buttons may interfere with the device being perceived as paper-like.

In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 1 button for power and one button for submit; a second example has a slider to choose a page among a large number of pages depending on the position of the finger and one or more buttons.

Referring now also to FIG. 2B, the back side of the computing pad 202 is shown. The computing pad 202 includes the camera 218 and an output device 220. As shown in FIG. 2B, the camera 218 is positioned with its lens facing outward on the back side of the computing pad 202 in the upper left-hand corner. The camera 218 is a conventional type such as those available on cell phones or notebook computers. The output device 220 is on the front side of the computing pad 202 and shown in FIG. 2A. The output device 220 is a device for displaying small images and is used as the camera's viewfinder. In one embodiment, the output device 220 is an organic light emitting diode (OLED) and is only operational when the camera is operational. In another embodiment, the output device 220 is used to indicate the status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. In another embodiment, the public key-private key pair is stored within a specialized trusted computing memory integrated with the CPU or main board of the device. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a document and storing metadata as part of a document. In one embodiment, the metadata module 312 is instructions executable by the processor 302 to provide the functionality described below with reference to FIGS. 5-9 for accessing both image/page metadata as well as document metadata. In another embodiment, the metadata module 312 soft routines for presenting the user interfaces, capturing stroke information, and routing (sending documents from and receiving at the portable computing device 102) documents according to the workflow. In one embodiment, the metadata module 312 is stored in the memory 304 and is accessible and executable by the processor 302. In any event, the metadata module 312 is adapted for cooperation and communication with the processor 302 and other components of the computing pad 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled log at the computing pad 202 and the stroke and image workflow server 106. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving documents from the stroke and image workflow server 106. In other embodiments, the document transfer module 316 sends and receives documents as formatted messages from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the document or formatted message from the computing pad 202 such as by email, file transfer, XMPP or special purpose application.

In a first embodiment, the document transfer module 316 is client software operational on the computing pad 202 that maintains a directory structure that serves as an inbox. The document transfer module 316 moves documents from a corresponding inbox on the stroke and image workflow server 106 to this directory. Once a document in the inbox of the computing pad 202 has been annotated and the user inputs the submit instruction, the document transfer module 316 removes the document from the directory structure and transfers it to the stroke and image workflow server 106 for further processing.

In a second embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 is configured to use either. The messages are in a format the computing pad 202 can directly use, e.g. an attachment of image files. The messages are in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a third embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a fourth embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this allows a service to transmit an image for the pad at the same time as strokes are being transmitted from the pad to server. Instant messaging protocols can also be useful if a group of computing pads 202 is sharing a display space and thus all members of the group may be informed of new strokes.

In a fifth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file. In one example embodiment, the document transfer module 316 is rsync. Rsync is a data transfer software application for Unix that synchronizes files and directories from one location to another while minimizing data transfer using delta encoding when appropriate. In the embodiments noted above, the document transfer module 316 might be implemented a store and forward system which opportunistically transmits the documents only when network connectivity is available.

The document creation module 318 is software or routines for creating new documents. The document creation module 318 is operable on the processor 302 and is coupled to the bus 320 for communicating with the other components of the computing pad 202. The document creation module 318 is responsive to signals from the input devices 210-218 or the stroke capture device 208. The document creation module 318 stores template forms of documents in the memory 304. In response to user input, the document creation module 318 accesses the stored template forms and copies the selected one to create a new document from the template form. Once created, the document stored in memory 304, is added to the inbox list maintained by the presentation module 322, and is otherwise editable, manipulatable and transmittable just like any other document.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the presentation module 322 and the other applications 324. There may also be a plurality of busses in computing system 202, designed to provide the most efficient communications between functional elements.

The presentation module 322 is software and routines for displaying documents and the inbox on the display device 206, and adjusting the display of the image responsive to input from input devices 210-216. The presentation module 322 performs routines that generate the dual mode user interface shown in FIGS. 2, 8 and 9. The presentation module 322 also cooperates with the automatic capture module 328 to generate an automatic capture interface as will be described below with reference to FIGS. 10 and 11. In one embodiment, the presentation module 322 is a thin client routine executable by the processor 302 to cause display of the image on the display device 206. The presentation module 322 is coupled by the bus 320 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

The automatic capture module 328 is software and routines for automatically capturing images in response to the capture image command, for determining the context of operation of the computing pad 202 and inserting the captured images into documents. For example, the automatic capture module 328 is responsible for determining the document that is currently being displayed by the computing pad 202. In one embodiment, the automatic capture module 328 is also responsible for directly or indirectly creating new pages, adding a captured image to the newly created page and adding newly created page with the captured image to a document. In another embodiment, the automatic capture module 328 also determines whether a document includes a picture rectangle, captures an image, and replaces the picture rectangle with the captured image in the existing document. The operation of the presentation module 322 will be described in more detail below with reference to FIGS. 6-11.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O Devices 326 to facilitate power systems control, as well as off-load the main processor 302 from lower-speed lesser-important tasks.

Stroke and Image Workflow Server 106

Figure 4:
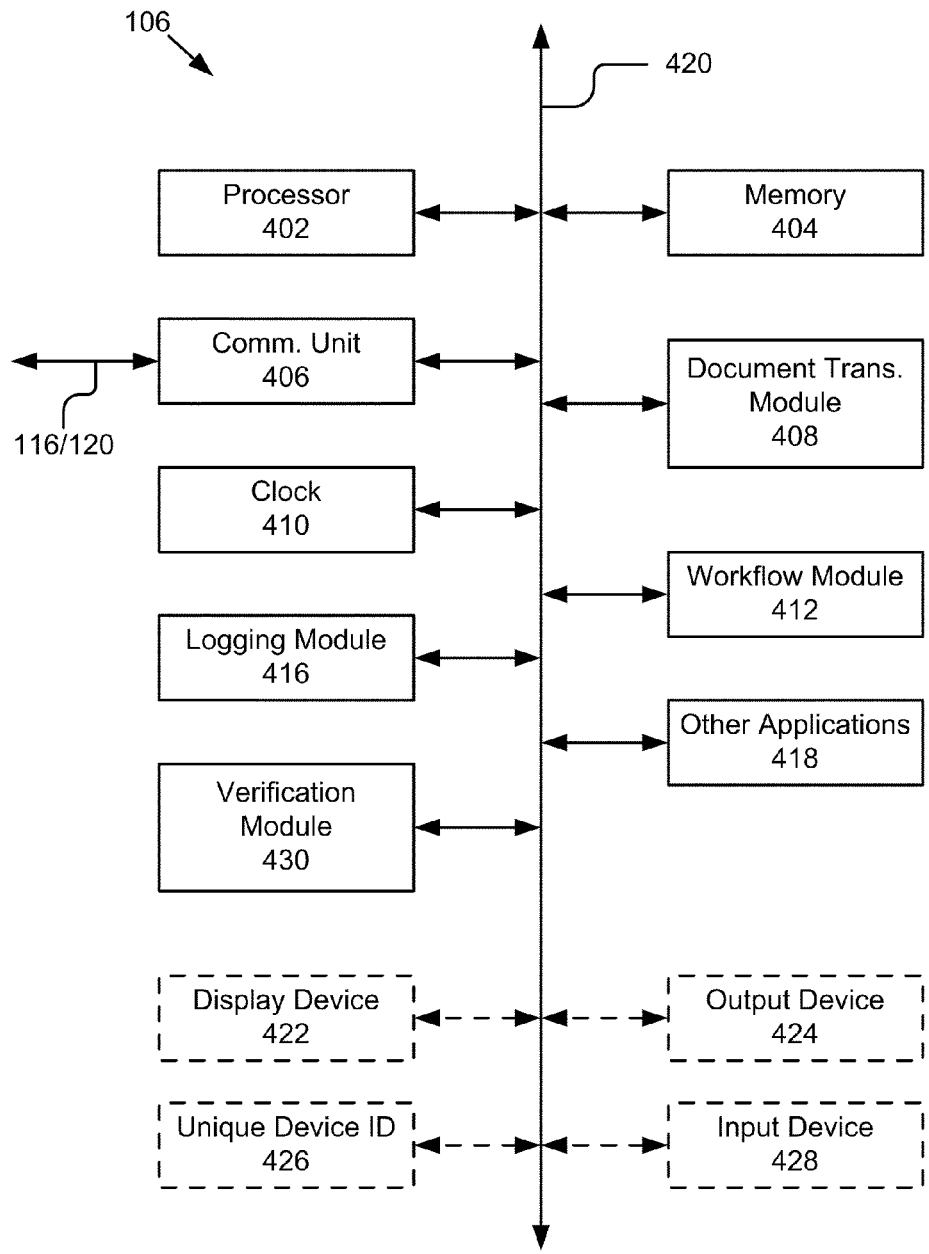
FIG. 4 is a block diagram of an embodiment of the stroke and image workflow server in accordance with the present embodiment of the invention.

Referring now to FIG. 4, an embodiment of a stroke and image workflow server 106 will be described in more detail. The stroke and image workflow server 106 comprises a processor 402, a memory 404, a communication unit 406, a document transfer module 408, a clock 410, a workflow module 412, a logging module 416, other applications 418, a bus 420 and a verification module 430. In an alternate embodiment, the stroke and image workflow server 106 further comprises a display device 422, an output device 424, a unique device ID storage 426 and an input device 428.

Those skilled in the art will recognize that some of the components of the stroke and image workflow server 106 have the same or similar functionality to the components of the computing pad 202 so descriptions of these components will not be repeated here. For example, the processor 402, the memory, 404, the communication unit 406, the document transfer module 408, the logging module 416, the clock 410, the other applications 418, display device 422, output device 424, unique device ID 426 and input device 428 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 406 may couple the stroke and image workflow server 106 to the network 104 in a wired manner instead of wirelessly. The processor 402 is more computationally powerful than the processor 302 as the workflow server 106 likely services numerous portable computing devices 102. The document transfer module 408 is an e-mail server as opposed to an e-mail client. The display device 422 may be a CRT, and the output device 424 is speakers. The input device 428 includes a keyboard and mouse type controller. Those skilled in the art will recognize that there may be a variety of other differences as the components of the stroke and image workflow server 106 acts as a hardware server as opposed to a remote client.

The verification module 430 of the stroke and image workflow server 106 is software and routines for verifying the processing of a document. In one embodiment, the verification module 430 is routines executable by the processor 402 to perform verification of document processing as described below. The verification module 430 is coupled by bus 420 to the processor 402, the memory 404 and the communication unit 406. Note that the verification module 430 might be used independently of the stroke and image workflow server 106. In fact, it might run on the computer 108 for independent verification of documents without need to trust a particular server.

The workflow module 412 of the stroke and image workflow server 106 is software and routines for processing and routing documents or formatted messages. The workflow module 412 creates documents 400 or creates formatted messages. The workflow module 412 also works with the logging module 416 to create a system log (stored in the logging module 416, the memory 404 or the data storage 110) and publishes or makes available that log as needed. The workflow module 412 is also responsible for routing the document or formatted messages on to the next location as part of a processing workflow. In one embodiment, the computing pad 202 returns documents by submitting them or sends reply emails including attachments to the stroke and image workflow server 106, and the workflow module 412 determines the routing and next workflow step. It should be noted that the process of creating a system log by the workflow module 412 can create a entangled log, and that the presences of multiple workflow modules 412 servicing distinct pages of the document greatly increases the difficulty of tampering with the document without being detected. For example, a workflow server 106 might create a notepad document which will be transmitted to all meeting members after the end of a meeting. The notepad document would be created with a "next destination" URL containing a group email address. The workflow server 106 would route the document to each member of the group once the notepad is submitted back to the workflow server 106 by the tablet.

For convenience and ease of understanding, the forwarding of documents and the processing of documents within the workflow is described below as being performed by the workflow module 412 of the stroke and image workflow server 106; however, those skilled in the art will recognize that alternatively the same operations may be performed by the computing pad 202. Alternatively, those skilled in the art will recognize that the document routing process and workflow rules might be implemented by separate servers, instead of being implemented as one integrated server.

Those skilled in the art will recognize that there are a variety of ways that the workflow module 412 of the stroke and image workflow server 106 determines what to do with the document once it has been received from the computing pad 202 (submitted by the computing pad 202). In one embodiment, computing pads 202 are configured to work with a particular stroke and image workflow server 106 and submit a page to the stroke and image workflow server 106;

for that page, the stroke and image workflow server 106 then determines the next step based on preprogrammed rules. In one embodiment, the stroke and image workflow server 106 determines how to process the document based upon on metadata stored inside the document itself. The metadata may specify additional processing of the document, how the document is to be routed, and to what other computing devices it is to be routed. For example, an ordered series of email addresses stored as metadata is one example of a workflow where the document will be passed to each successive email address. The metadata may also be provided on an entire document basis or a page basis.

In another embodiment, workflows are specified in the document or in the email (formatted message) in which the document was sent. In the simple case of receiving a document by email, the computing pad 202 returns the completed document to the stroke and image workflow server 106. The stroke and image workflow server 106 then extracts the metadata from the completed document, determines the next step in the workflow, and then sends the completed document to the device (e.g., computer 108) identified to perform the next step in the workflow. In an alternate embodiment, the computing pad 202 returns the completed document by e-mail to the stroke and image workflow server 106, and the e-mail includes the workflow. The stroke and image workflow server 106 determines the next e-mail address in which to send the completed document from the e-mail that included the completed document. In an alternate embodiment, HTTP headers could be used instead of or in addition to e-mail headers. If the documents are being transported in a manner that supports page images, strokes, and metadata, then the metadata can contain the workflow instructions and status. Again, in the simple case, the metadata includes a list of email address and the current step of the workflow.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the computing pad 202 support a wide range of document formats. Providing pure images, i.e. not files requiring rendering, to the computing pad 202 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. Those skilled in the art will recognize that the document directories can be transferred and stored as standard ZIP format archives.

Multiple page image files which share the same initial name segment are considered to be alternate representations of the file, of equivalent quality, and the presentation module 322 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "document.d". This directory is included at the top level directory. It is useful to store a log of actions associated with a document in the document metadata. In one embodiment, the system 100 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Methods

Figure 5:
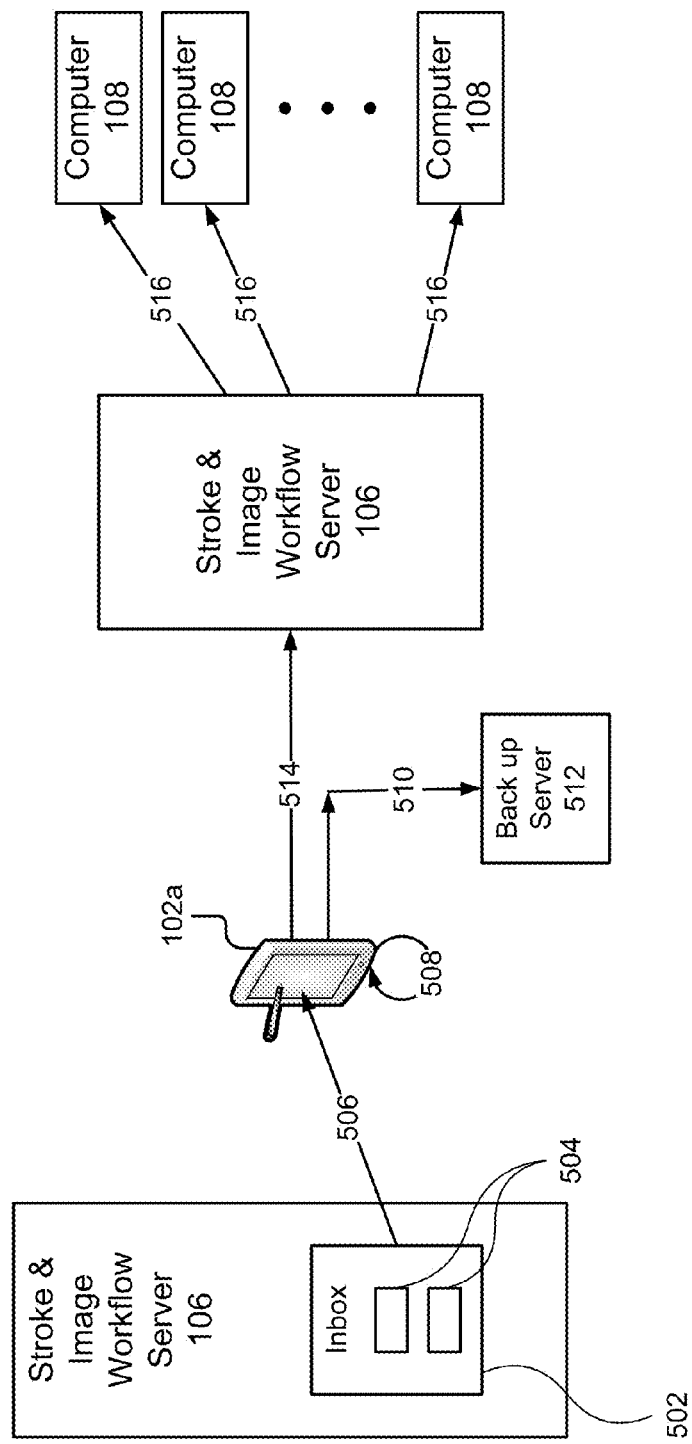
FIG. 5 is a schematic flow diagram illustrating the automatic document processing in accordance with the present embodiment of the invention.
Figure 6:
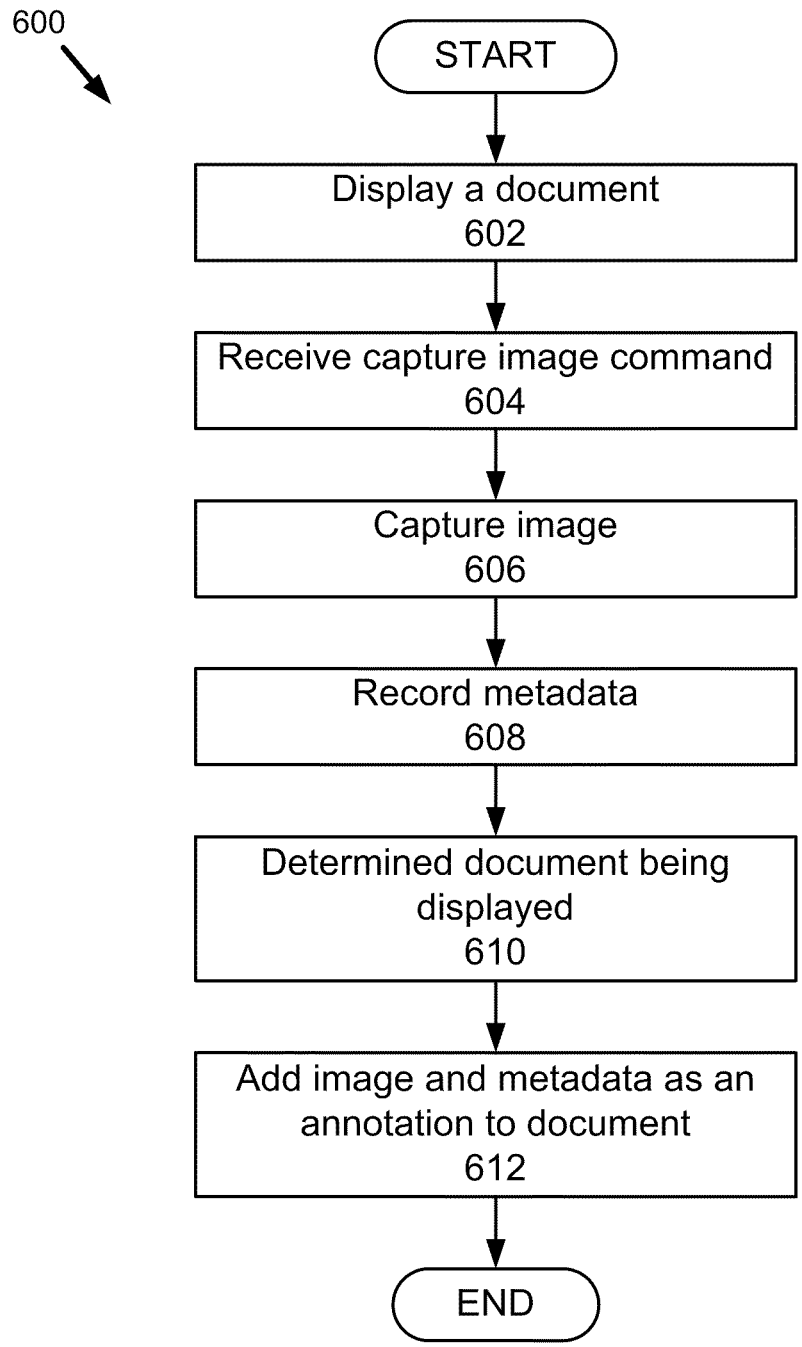
FIG. 6 is a flow chart illustrating a first embodiment of a method for automatic attachment of a captured image in accordance with the present embodiment of the invention.
Figure 7:
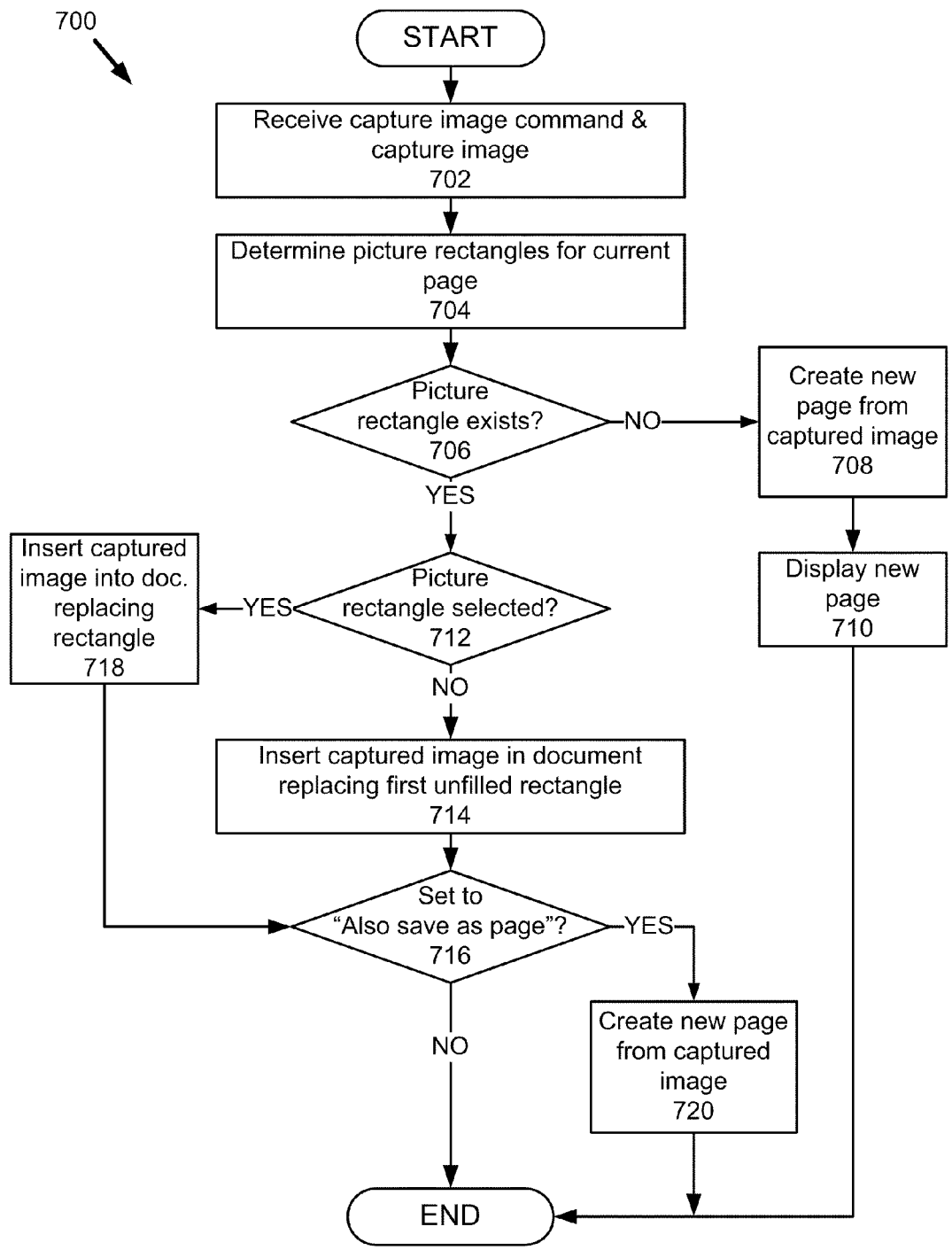
FIG. 7 is a flow chart illustrating a second embodiment of a method for automatic attachment of a captured image in accordance with the present embodiment of the invention.

Referring now to FIGS. 5-7, the methods of the present embodiment of the invention will be described in more detail.

FIG. 5 shows one embodiment of an automatic document processing method in accordance with the present embodiment of the invention. The process begins with the stroke and image workflow server 106 creating and establishing an inbox 502 associated with a portable computing device 102a. The stroke and image workflow server 106 then creates and places one or more documents 504 in the inbox 502 that are scheduled for delivery to the portable computing device 102a. For example, the documents may be forms that the user of the portable computing device 102a needs to complete and return such as a medical information form. The stroke and image workflow server 106 automatically transfers 506 the documents 504 from the inbox 502 to a corresponding inbox (not shown) on the portable computing device 102a. Depending on the embodiment, the transfer of documents may occur at a number of different times: 1) once the documents 504 are placed in the inbox 502; 2) once the portable computing device 102a is coupled for communication with the stroke and image workflow server 106; 3) at periodic times, such as 15 minute intervals; or 4) various combinations of the above. Once the documents 504 have been transferred 506 to the portable computing device 102a, the portable computing device 102a is used to annotate the documents 504 and add strokes and other information to them. The annotations are added to the document 504 and the document 504 is stored back on the portable computing device 102a as depicted by line 508. In one embodiment, the information and the annotations added to documents 504 are backed up 510 off of the portable computing device 102a to a backup server 512. This transfer of documents can occur at times similar to those described above. Those skilled in the art will recognize that this step of backing up annotations made with the portable computing device 102a may be performed at regular intervals such as every 10 minutes or longer to preserve power of the portable computing device 102a. In yet another embodiment, the backup interval can be set by the user. Once the user has completed adding annotations to a particular document 504 and the document 504 is ready for submission, the user inputs a submit instruction and the annotated document 504 is transferred 514 from the portable computing device 102a to the stroke and image workflow server 106. Once the annotated document 504 is received at the stroke and image workflow server 106, it is stored, logged and the next step in the workflow process is determined. Based on the determination of where the document 504 should be sent to next, the stroke and image workflow server 106 transmits 516 the document to the determined device (e.g., the other computers 108). While FIG. 5 illustrates the plurality of computers as being computer 108, those skilled in the art will recognize that computer 108 represents a variety of different vendors capable of performing additional processing or annotation to the document 504.

The present embodiment of the invention is particularly advantageous because of the level to which it automatically processes forms or documents and advances them in a workflow. FIG. 5 described above illustrates how the present embodiment of the invention is automatic in that forms or documents are automatically advanced in the workflow and sent from the stroke and image workflow server 106 to the portable computing devices 102a-n. Once the forms or documents have been annotated by the user, they are sent back to the stroke and image workflow server 106 with the user merely having to input a single "submit" command or instruction. This automatic level processing of forms or documents is particularly advantageous because it makes the portable computing devices 102a easy and simple enough to use for every day document processing. Moreover, the present embodiment of the invention lends itself to providing the user with an experience or interaction that very closely mimics the use of pencil and paper, thereby requiring little or no learning curve.

The present embodiment of the invention is also advantageous because it provides a series of user interfaces that are very simple and easy-to-use. In particular, the user interfaces that will be described below provide two modes of interaction with the computing pad 202. In a first mode (inbox mode), a user interface (See 800 in FIG. 8) presents an inbox that lists all the documents that are modifiable, editable or annotable by the user. In this first mode, the user is limited to three actions: 1) re-sort the order in which the documents are listed; 2) select a document for editing; 3) create a new document for editing. In a second mode (document annotation mode), a user interface (See 900 of FIG. 9) is presented that displays an image of a document. Again, the user is limited to three actions: 1) add stroke or annotations to the document; 2) add a picture to the document; 3) transition to displaying a different page of the image or transitioning back to the inbox mode. The present embodiment of the invention is particularly advantageous because it limits the number of decisions required by the user. By providing only two interfaces in which to interact with documents and constraining the number of actions that may be taken in each mode, the user interface is elegantly simple and efficient. This allows the user interfaces to be adopted easily with little or no learning curve, providing a user experience that mimics the interaction with paper, and integrating the collection of collection of information with automatic processing within a workflow. Furthermore, the present embodiment of the invention provides a single command workflow routing.

Figure 8:
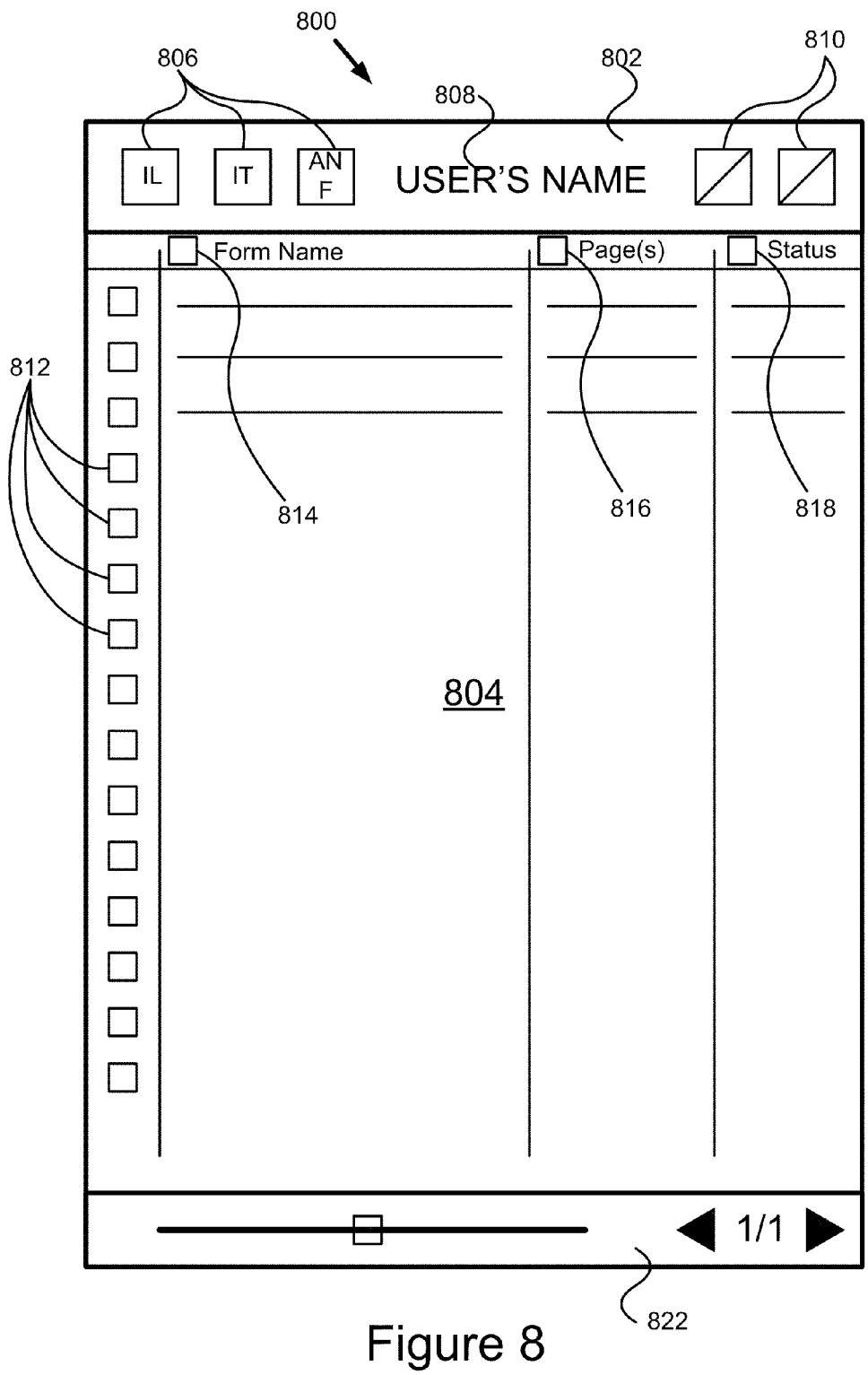
FIG. 8 is a graphic representation of one embodiment of the inbox user interface in accordance with the present embodiment of the invention.

Referring now to FIG. 8, one embodiment for the inbox view or user interface 800 is shown. The inbox view 800 is a window including a menu area 802, a display area 804 and a navigation area 822.

The menu area 802 includes a plurality buttons 806, a label 808 for the computing pad 202, and status indicators 810 for the computing pad 202. The buttons 806 allow the user to modify how the documents are listed in the inbox or to create a new document. For example, one button 806 labeled "IL" (Inbox List) presents the documents in the inbox as a list as shown in FIG. 8. Another button 806 labeled "IT" (Inbox Thumbnail) causes the display area 804 to show the documents as thumbnail images of the first page of each document. A third button 806 labeled "ANF" (Add New Form) toggles between the user interface of FIG. 2A that shows selectable templates of new documents that can be created along the bottom of the window of the display device 206 and the display shown in FIG. 8 in which there is not an area that allows the user to create new documents. The label 808 is some indication of the owner of the computing pad 202 such as the user's name. The status indicators 810 are icons used to show the status of the computing pad 202. For example, different icons such as a series of bars, a series of radio slats or a battery may be shown to indicate the status of the Wi-Fi signal, a 3G signal (or Bluetooth), or a battery respectively.

The display area 804 includes a plurality of selection buttons 812, a series of columns, and a series of buttons 814, 816, 818 and labels. The present embodiment of the invention advantageously lists the documents each having a corresponding row with a series of columns similar to the presentation of e-mails in inbox. Each of the documents (row) has a corresponding selection button 812. When the user selects the selection button 812, the computing pad 202 transitions from the inbox view 800 of FIG. 8 to the form view 900 of FIG. 9 with the selected document being displayed. Each row has four columns, one for the selection button 812, one for form name, one for the number of pages in the document, and finally one for the status of the document. An area proximate the top area of the display area 804 provides a series of column headers. In one embodiment, the three columns each have a selection button 814, 816, 818 and a corresponding label. For example, the second column includes the selection button 814 and the label "form name," the third column includes the selection button 816 and the label "Page(s)," and the fourth column includes the selection button 818 and the label "Status." In one embodiment, only one of the three selection buttons 814, 816, 818 is selectable at any given time. Based on the selection of the user the documents listed and shown in the display area 804 are sorted according to the attribute of the selection button 814, 816, 818. In other words, the documents are listed sorted either according to form name, number of pages or status. The status of a document is its status in the work flow or its status of review or editing. The status of any document in the inbox can be one of the following and they may be provided with an icon visually corresponding to their status: 1) submitted an uploaded; 2) submitted (but not uploaded); 3) edited; 4) read (but not edited); and 5) new (not opened).

The navigation area 822 includes controls to navigate between pages and an indicator as to what page of the document is being displayed. For example, the navigation area includes a slider bar with the square or rectangle indicating the page position within the document. The navigation area 822 also includes a pair of buttons to navigate to the next page or previous page with an indication of which page in the total number of pages between the two buttons.

Figure 9:
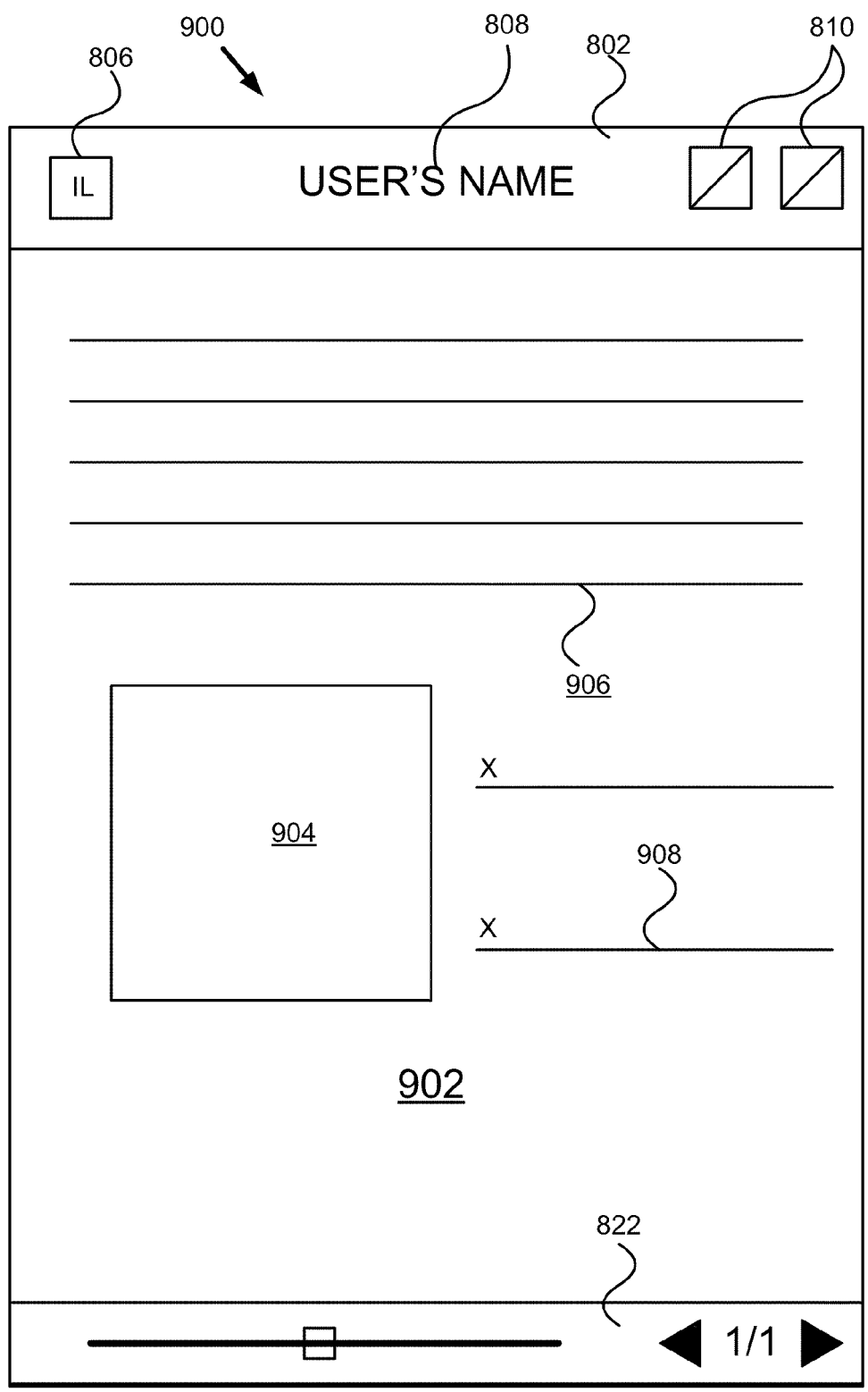
FIG. 9 is a graphic representation of an example form displayed in one embodiment of the form user interface in accordance with the present embodiment of the invention.

Referring now to FIG. 9, one embodiment for the form view or user interface 900 is shown. The form view 900 is a window including a menu area 802, a display area 902 and a navigation area 822. The menu area 802 of the form view 900 is similar to that described above for the inbox view 800; however, the menu area 802 of the form view 900 only includes a single button 806 that transitions from the form view 900 to the inbox view 800. The navigation area 822 of the form view 900 is similar to that described above for the inbox view 800 so that description will not be repeated here.

The display area 902 of the form view 900 is used to display an image of a page of the document. FIG. 9 shows an example form with a plurality of areas such as an area for inserting an image 904, an area 906 for filling in responses to questions, and area for signatures 908. During display of the form view 900, the user can add annotations to any of the above areas 904, 906 and 908 simply by moving the stylus 204 over the display 206. Those skilled in the art will recognize that any number of different types of forms or documents may be displayed and that these forms may have various different pages including text-only, or text in combination with any of the areas 904, 906 and 908. This user interface is purely advantageous because it allows the user to process the document by annotating it in the form view 900 just as the user would with a piece of paper. Once the user has completed all her annotations to the document, she need only hit the submit button 214, and the computing pad 202 automatically records these annotations, stores the document of the computing pad 202, forward the document to the stroke and image workflow server 106, and the stroke and image workflow server 106 complete additional processing on the annotated document as necessary. For example, in one embodiment when the form view 900 is being displayed and the user selects or presses the submit button 214, the computing pad 202 determines the document that is currently being displayed in the form view 900, creates an annotated document by adding any strokes or other input that have been received by the computing pad 202 for this document (they may or may not have been stored at the computing pad 202), then sends the annotated document to the stroke and image workflow server 106. In an alternate embodiment, the computing pad 202 determines not only the document but also the page that is currently being displayed in the form view 900, and only submits the page of the document to the stroke and image workflow server 106. In yet another embodiment, the computing pad 202 determines whether it has received any stroke input or other input that can be added to the document to create and annotated document. If the computing pad has received some stroke input or other input, the process continues as described above by creating an annotated document and sending it from the computing pad 202 to the stroke and image server 106. On the other hand, if the computing pad 202 has not received stroke input or other input the computing pad 202 displays an error message to the user indicating that no editing has been done on the document being displayed in the form view 900; and therefore, no document or annotated document will be sent to the stroke and image workflow server 106. In yet another embodiment, the computing pad 202 ensures that any document presented in the form view 900 has been completed to the level desired by the recipient. For example, a document may require that a particular number of fields out of all fields in the document be completed before the document may be submitted. In such a case, the computing pad 202 determines whether the number, length, and other features of the input data are sufficient enough to meet the requirements of the document being presented in the form view 900. If so, the computing pad 202 creates an annotated document from the requisite input and sends the annotated document to the stroke and image workflow server. If not, the computing pad 202 displays one or more error messages indicating that required fields of the document have not be completed and therefore the document cannot be (and will not be) submitted. The error messages may range from just a general error message to more particular error messages that identifies to the user what field of the former page must be completed before it can be submitted. Those skilled in the art will recognize from the description of above that there are a variety of modifications to the different enforcement scenarios that may be applied by the computing pad 202 before submission of the document is executed by the computing pad 202

Referring now back to FIG. 2A, an embodiment of a new form view 734 is shown. The new form view 734 is similar to the inbox view 800 described above. However, the new form view 734 also includes a bottom region 750 including a label, a navigation area and a new form template area. Within the new form template area are forms that are selectable by the user. In response to selection of one of the forms in the template area, the computing pad 202 creates a new form of that type that was selected and adds it to the list maintained by the inbox. FIG. 2A shows the inbox with no documents and prior to user selection of a form from the template area. In an alternate embodiment, each thumbnail image of a form template may include a checkbox proximate the upper left corner of the thumbnail. In response to user selection of the checkbox the computing pad 202 performs the steps of creating and adding a new document to the inbox.

Automatic Image Capture

Referring now to FIG. 6, a first embodiment of a method 600 for automatic attachment of a captured image in accordance with the present embodiment of the invention is described. The method 600 begins with the user operating in the form view mode with the computing pad 202 displaying 602 a document such as in the form view 900 shown in FIG. 9. Next, the computing pad 202 receives 604 a "capture image" command. For example, this might occur when the user depresses the second button 212 of the computing pad 202. Pressing the second button 212 controls the operation of the camera 218 and when selected causes the camera 218 to capture an image. In response to selection of the button 212, the computing pad 202 causes the camera 218 to capture 606 and image. At the same time or time near image capture, the computing pad 202 also records 608 any metadata associated with the computing pad 202. For example, the metadata includes time of day, date, GPS location, computing pad orientation, computing pad 202 information such as version of firmware and operating system, the IDs of any other devices within radio communication of the computing pad 202, other information or combinations for the foregoing. Next, the method 600 determines 610 the document being displayed by the computing pad 202. In one embodiment, the automatic capture module 328 cooperates with the processor 302 and the presentation module 322 to determine which document is being presented on the displayed 206 of the portable computing pad 202. In other embodiments, the exact page that is being displayed is determined. The identification of the document and page provides a directory location at which to add any captured images and store the recorded metadata. Finally, the method 606 adds 612 the captured image and its associated metadata as an annotation to the document. As noted above, this information can be added in the determined directory location. In a first embodiment, this is done by adding the captured image to the same directory location as the document and adding the new metadata to the metadata for the document. In a second embodiment, the automatic capture module 328 creates a new page in the document and then adds the image to that new page. In this embodiment, the metadata is also added to the new page. In a third embodiment, each page of each document has metadata associated with it. Part of this metadata associated with each page is one or more locations for images to be added. In this third embodiment, the captured image is added at a location specified by the metadata.

Referring now to FIG. 7, a second embodiment of the method 700 for automatic attachment of a captured image in accordance with the present embodiment of the invention is described. For this method 700, it is assumed that the user is displaying a document on the display device 206 of the computing pad 202. Additionally, it is assumed that it is possible for a document to include metadata for a least one page, and that the metadata can specify locations at which images should be positioned. The metadata specifies these locations using what are referred to throughout this application as "picture rectangles." Picture rectangles are simple pairs of x,y coordinates representing rectangular areas of the base page image where picture data should be integrated into the form. Alternatively, a "picture rectangle" might represent any pixel region of a base page image. It might be specified as all pixels of a certain color value in the base page image. Those skilled in the art will recognize that such destination areas of the page might be specified using many geometric approaches, such as polygons, splines, two-dimensional run-arrays, masking channel bitmaps, or any of a number of other methods well known in the art even though the term rectangle is used. A more specific example that utilizes picture rectangles will also be described below with reference to FIG. 10.

The method 700 begins with the computing pad 202 receiving 702 a captured image command and capturing an image using the camera 218. Next, the method 700 determines the page of the document being displayed and determines 704 whether there are any picture rectangles for the current page. In one embodiment, a list of picture rectangles for the current page is read from metadata for the page to make this determination. Next the method determines 706 whether a least one picture rectangle exists for the page. If not, the method creates 708 a new page from the captured image, and then displays 710 the new page on the display device 206 of the computing pad 202. After which, the method is complete and ends.

On the other hand, if a least one picture rectangle exists for the current page, the method 700 transitions from step 706 to 712. In step 712, the method 700 determines whether the user has selected a picture rectangle. In one embodiment, the user can add stroke annotations over the page being displayed on the computing pad 202 to select a picture rectangle. By adding strokes to a selection box for a picture rectangle, effectively identifies to the computing pad 202 where the user would like to add the captured image. If the user has selected a picture rectangle, the method 700 continues by inserting 718 the captured image into the current document at the displayed page in place of the picture rectangle. Once the captured image has been inserted into the document, the method continues to step 716.

If the user has not selected a picture rectangle, the method 700 continues from step 712 to step 714. In step 714, the method 700 identifies the first unfilled picture rectangle for the page, and inserts the captured image into the page of the current document in place of the identified unfilled picture rectangle. The method 700 continues to determine whether a flag is set that specifies that automatic capture should both store the image in place of a picture rectangle, and also add a new page and save the image to that new page. If the "also save as page" flag has not been sent them the method 700 is complete and ends. However, if the "also save as page" has been set, the method 700 continues to create 720 a new page from the captured image and store it. This image is a full resolution copy of the image data inserted into the picture rectangle, and might be marked with metadata that tie it programmatically to the specific picture rectangle selected. After the captured image has been stored, the method 700 is complete and ends.

Figure 10:
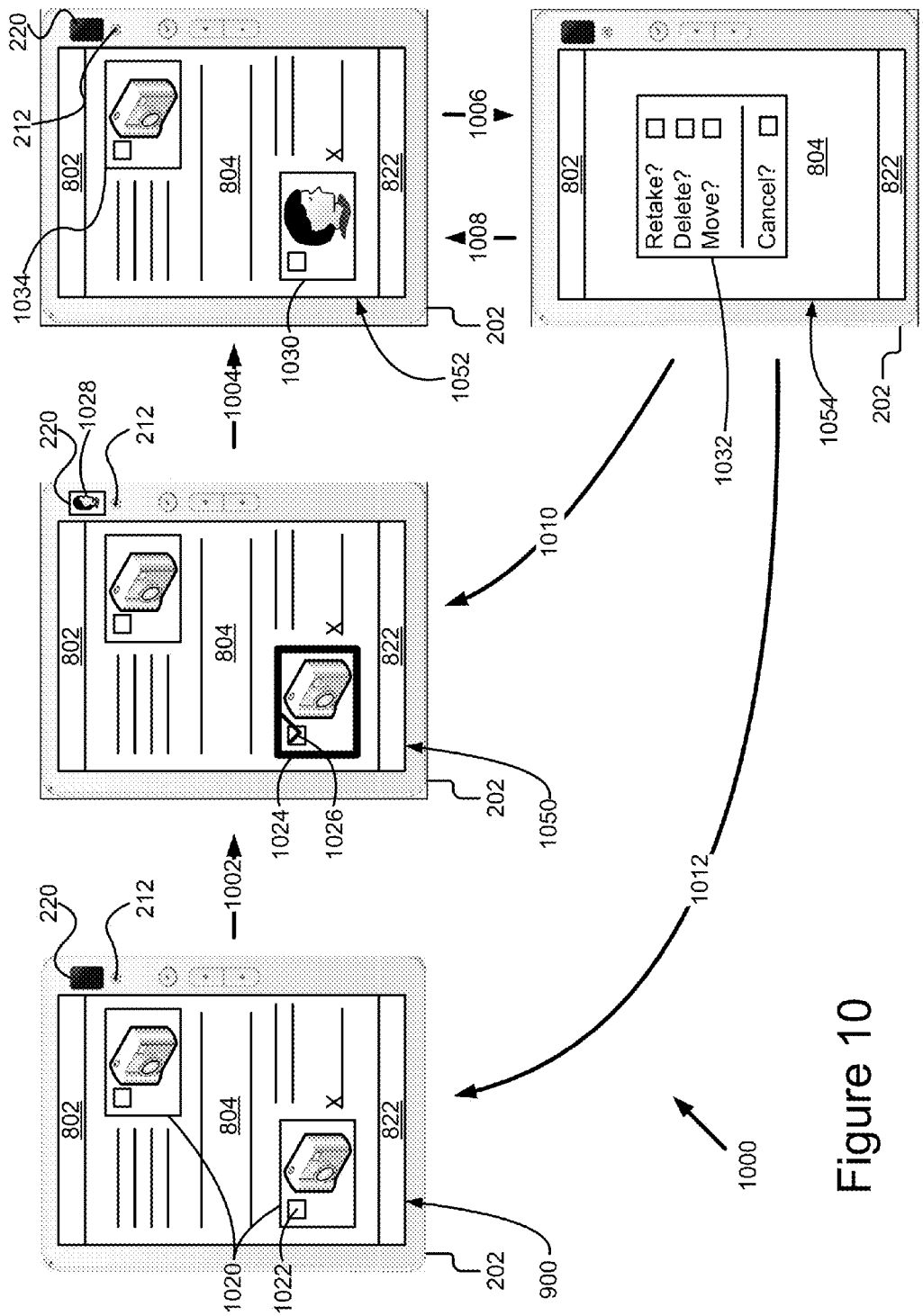
FIG. 10 is a flow diagram of the user interfaces for automatic attachment of a captured image in accordance with one embodiment of the present embodiment of the invention

Referring now to FIG. 10, a third embodiment of a method 1000 for automatic attachment of a captured image will be described. FIG. 10 illustrates a flow diagram that shows the interaction between the computing pad 202 and the user as well as the user interfaces generated by the presentation module 322 in cooperation with the automatic capture module 328. The method 1000 begins with the computing pad 202 displaying an example document in the form view 900. As has been described above with reference to FIG. 9, the form view 900 includes a menu area 802, a display area 804 and a navigation area 822. For simplicity and ease of understanding, the menu area 802 and the navigation area 822 are shown in FIG. 10 as simple boxes. However, it should be understood that the menu area 802 and the navigation area 822 can present information and have similar buttons to provide functionality as has been described above with reference to FIG. 8.

Returning back to FIG. 10, the example document is shown in the display area 804 of the form view 900. The example document includes a pair of picture rectangles 1020. These picture rectangles 1020 are areas that the creator of the document has designated as possible points of insertion for the user to insert captured images. Each of the picture rectangles 1020 also includes a respective selection checkbox 1022. The selection checkbox 1022 is an area that can be selected by placing a stroke over the selection checkbox using the stylus 204. While the example document shown in the form view 900 has two picture rectangles 1020, those skilled in the art will recognize that a particular document may have any number of picture rectangles from zero to the maximum allowable on a single page (in certain embodiments 100).

The form view 900 displays the example document and the computing pad 202 allows stroke annotations to be added to the example document. The stroke annotations can be added anywhere in the lined areas and there is even an area denoted as requiring or requesting a signature for this particular form. If the user uses the stylus 204 to add a checkmark stroke over the checkbox 1022, the stroke capture module 208 captures a stroke input and sends it to the automatic capture module 328. The automatic capture module 328 then transitions or update 1002 the display from the form view 900 to the form view 1050.

In form view 1050, the box around a picture rectangle 1024 is shown in a visually distinct manner such as bolded or highlighted. The checkbox 1026 is also updated to show a checkmark. This form view 1050 thereby provides the user with visual feedback as to where the picture will be inserted when the image is captured. After the transition 1002 to form view 1050, the automatic capture module 328 also activates the output device 220 (for example, OLED). The activated output device 220 shows an image 1028 of a person that is currently being captured by the camera 218 as can be seen by a comparison of form view 902 4105 zero. The checkmark in the checkbox 1026 also indicates to the user that the computing pad 202 is activated, in particular the output device 220, and ready to capture an image.

Once the user presses the second button 212, the computing pad 202 in response captures an image with the camera 218. The automatic capture module 328 processes the captured image and stores it as part of the document. The automatic capture module 328 also updates 1004 the display 206 to show the form view 1052. In the form view 1052, the second picture rectangle 1030 has been updated to show the captured image. The second picture rectangle 1030 also includes a new, unchecked, checkbox. Thus, the present embodiment of the invention is particularly advantageous because while viewing a form (form view 900), the user need only add a stroke over the second picture rectangle and the form view is updated (form view 1050), the output device 220 is activated and then simply by pressing the second button 212 an image is captured and displayed in the second rectangle 1030 (form view 1052). The present embodiment of the invention advantageously automatically recognized the context in which the image is being captured and adds the captured image to the document being displayed.

As noted above, in form view 1052 the second rectangle 1030 includes an unchecked checkbox. If the user adds a checkmark over the checkbox, the computing pad 202 transitions 1006 the display 206 from form view 1052 to form view 1054. Form view 1054 presents an instruction box 1032 that includes a plurality of checkboxes each corresponding to a different command. For example, the different commands include retaking the picture, deleting the picture, moving the picture or canceling the entire operation. The user can add a stroke over any of the checkboxes and the computing pad 202 will transition to form view 900, form view 1050, or form view 1052 as well as performing other actions to modify the document into a state corresponding to those views. If the user inputs a stroke over the checkbox corresponding to the retake command, the computing pad 202 transitions 1010 from form view 1054 back to form view 1050, deletes the existing captured image, and the computing pad 202 is ready to capture another image (retake the picture). If the user inputs a stroke over the checkbox corresponding to the delete command, the computing pad 202 transitions 1012 from form view 1054 to the form view 900, deletes the existing captured image and the form is reset to its original state prior to the image capture processing being started. If the user inputs a stroke over the checkbox corresponding to the cancel command, the computing pad 202 transitions 1008 from form view 1054 to form view 1052, and the computing pad 202 retains the captured image. If the user inputs a stroke over the checkbox corresponding to the move command, the computing pad 202 would highlight all other destination picture rectangles, and wait for a stroke input from the user. If this stroke input originates within one of the destination picture rectangles, then the image will be removed form its current location and replace the newly chosen picture rectangle. For example, a move would show an interface similar to form view 1052 but with picture rectangle 1034 highlighted. If the user inputs strokes in picture rectangle 1034, the computing pad 202 will move the picture from picture rectangle 1030 to picture rectangle 1034. Those skilled the art will recognize that while only 2 picture rectangles 1030, 1034 are shown in FIG. 10, other embodiments may have any number of picture rectangles, therefore many other picture rectangles may be highlighted and the image moved to any one of those rectangles. In an alternate embodiment, the picture may be moved from a single location to a plurality of locations in response to stroke input over a plurality of picture rectangles. In yet another embodiment, an image may be put in place of an existing image, and the existing image deleted.

Figure 11:
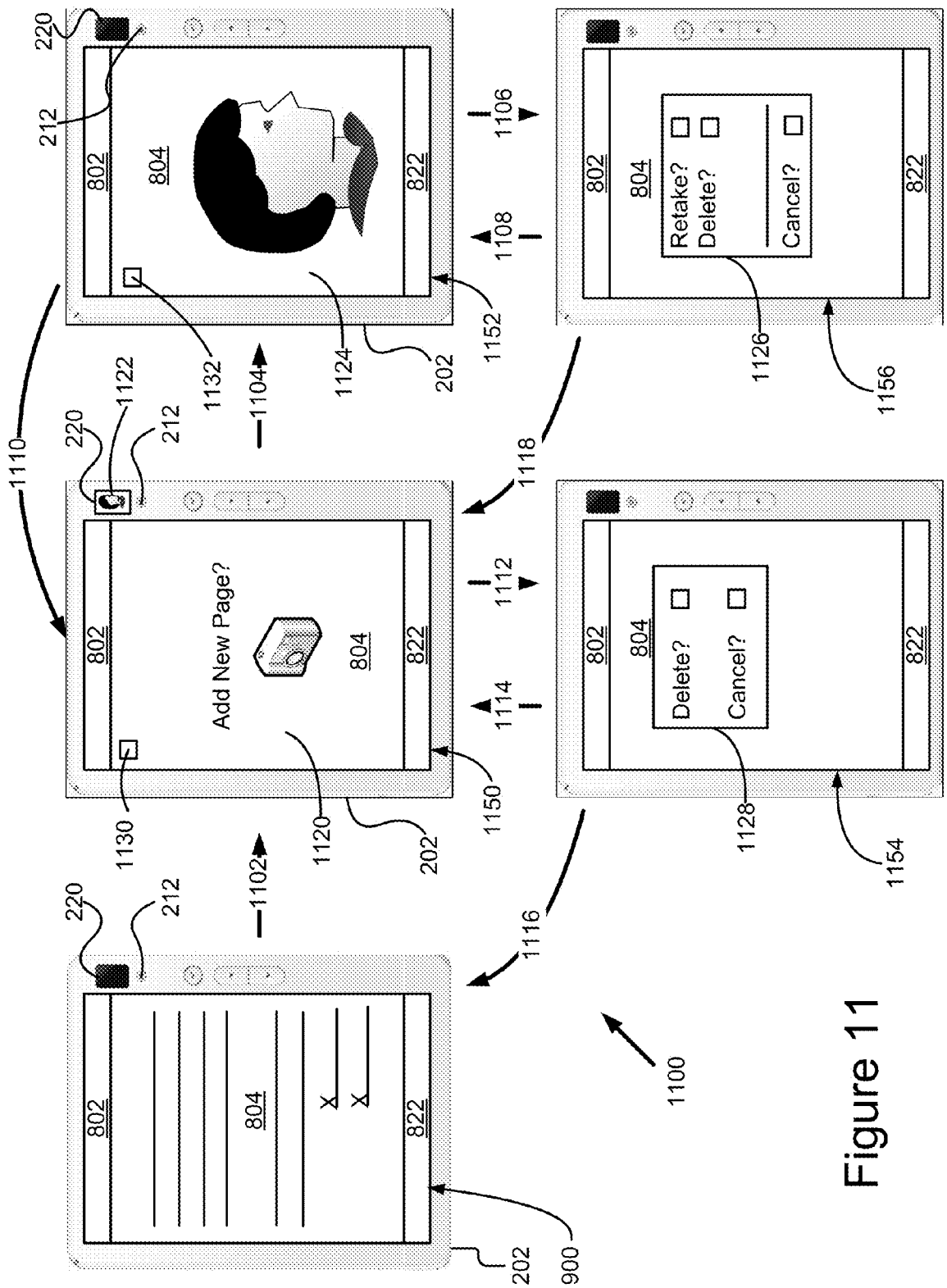
FIG. 11 is a flow diagram of the user interfaces for automatic attachment of a captured image in accordance with a second embodiment of the present embodiment of the invention

Referring now to FIG. 11, a fourth embodiment of a method 1100 for automatic attachment of a captured image will be described. FIG. 11 illustrates a flow diagram that shows the interaction between the computing pad 202 and the user as well as the user interfaces generated by the presentation module 322 in cooperation with the automatic capture module 328. The process described below with reference to FIG. 11 illustrates an embodiment of the present embodiment of the invention where any images captured are added as new pages. The method 1100 begins with the computing pad 202 displaying an example document in the form view 900. In this example, the document displayed does not have any picture rectangles. In response to the user depressing the camera button 212, the computing pad 202 transitions 1102 the display 206 from form view 900 to form view 1150. In form view 1150, the display area 804 shows an empty page 1120 with an icon of a camera, a message "Add New Page?", and the checkbox 1130. The computing pad 202 also activates the output device 220 to show the image 1122 that is currently being captured by the camera 218. This is particularly advantageous because the computing pad 202 conserves the amount of power utilized by only activating the camera 218 and the output device 220 when these devices are in use.

When form view 1150 is displayed, and the user adds a stroke over the checkbox 1130, the computing pad 202 transitions 1112 the display 206 to show form view 1154. The act of adding a stroke over the checkbox indicates to the computing pad 202 that the user wants to cancel out of the operation of capturing an image. In form view 1154, the computing pad 202 displays an instruction box 1128. In one embodiment, the instruction box 1128 includes a delete instruction, a cancel instruction and associated checkboxes. If the user adds a stroke over the checkbox associated with the delete instruction, the computing pad 202 changes 1116 the display 206 to show form view 900 with the document that the user was viewing just prior to transition 1102. On the other hand, if the user adds a stroke over the checkbox associated with the cancel instruction, the computing pad 202 changes 1114 the display 206 to return to form view 1150.

When form view 1150 is displayed and the user presses the camera button 212, the computing pad 202 changes 1104 the display 206 from form view 1150 to form view 1152. The computing pad 202 also captures an image 1124, and that image 1124 is displayed in the display area 804 of the user interface 1152. The display area 804 also includes a checkbox 1132 that allows navigation and other actions. If the user adds a check mark over the checkbox 1132, the computing pad 202 changes 1106 the display area 804 to show form view 1156. Form view 1156 includes an instruction box 1126. The instruction box 1126 includes a plurality of instructions and associated checkboxes. For example, the instruction box 1126 of FIG. 11 includes four instructions: retake, delete, move and cancel; and four corresponding checkboxes. If the user inputs a stroke over the checkbox associated with the retake instruction, the computing pad 202 transitions 1118 the display 206 to show form view 1150. If the user inputs a stroke over the checkbox associated with the cancel instruction, the computing pad transitions 1108 the display to show form view 1152. If the user inputs a stroke over the checkbox associated with the delete instruction, the computing pad 202 changes the display 206 back to form view 900.

When form view 1152 is shown, the user may also press the camera button 212 which causes the computing pad 202 to change 1110 the display 206 to show form view 1150, thereby adding additional pages allowing the user to capture additional pictures. Moreover, when form view 1152 is displayed by the computing pad 202, a selection by the user of button 216 to move to the previous or next page will cause the computing pad 202 to change the display from form view 1152 to form view 900. Using buttons 216 in this manner, the user is able to review and determine the precise page at which the captured image is located relative to existing pages of the document.

The foregoing description of the embodiments of the present embodiment of the invention has been presented for the purposes of illustration and description. It is not intended to be exhaustive or to limit the present embodiment of the invention to the precise form disclosed. Many modifications and variations are possible in light of the above teaching. It is intended that the scope of the present embodiment of the invention be limited not by this detailed description, but rather by the claims of this application. As will be understood by those familiar with the art, the present embodiment of the invention may be embodied in other specific forms without departing from the spirit or essential characteristics thereof Likewise, the particular naming and division of the modules, routines, features, attributes, methodologies and other aspects are not mandatory or significant, and the mechanisms that implement the present embodiment of the invention or its features may have different names, divisions and/or formats. Furthermore, as will be apparent to one of ordinary skill in the relevant art, the modules, routines, features, attributes, methodologies and other aspects of the present embodiment of the invention can be implemented as software, hardware, firmware or any combination of the three. Also, wherever a component, an example of which is a module, of the present embodiment of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of the invention is in no way limited to implementation in any specific programming language, or for any specific operating system or environment. Accordingly, the disclosure of the present embodiment of the invention is intended to be illustrative, but not limiting, of the scope of the present embodiment of the invention, which is set forth in the following claims.

The invention claimed is:

1. A computer implemented method for automatic attachment of an image to a document, the method comprising:
    receiving, with one or more processors, a capture image command on a first computing device;
    capturing, with the one or more processors, the image;
    determining, with the one or more processors, the document and a page in the document being displayed by the first computing device, the page including text and being displayed by the first computing device for receiving annotation;
    determining, with the one or more processors, page metadata stored within the page in the document;
    adding, with the one or more processors, the image as a first annotation to a first location on the page in the document, the first location being determined based at least in part on the page metadata;
    determining, with the one or more processors, a requirement for routing the document to a next computing device using the page metadata;
    determining, with the one or more processors, whether the first annotation of the image to the first location on the page satisfies the requirement for routing the document to the next computing device based on annotation metadata, wherein the first annotation of the image to the first location on the page is marked with the annotation metadata;
    responsive to determining that the first annotation of the image to the first location on the page in the document satisfies the requirement for routing the document to the next computing device, determining, with the one or more processors, a next step for the page in the document, the next step being determined based at least in part on the page metadata; and
    routing, with the one or more processors, the document to the next computing device to execute the next step on the page in the document, the next step being a second annotation to a second location on the page in the document.

2. The method of claim 1, further comprising:
    recording first computing device metadata that includes at least one of a time of day, a date, a location, a first computing device orientation and first computing device information; and
    adding the first computing device metadata to the page metadata.

3. The method of claim 2, wherein adding the image includes adding the image to a same directory location as the document and adding the first computing device metadata to document metadata.

4. The method of claim 1, wherein the first annotation of the image indicates a status of the page in the document.

5. The method of claim 1, further comprising:
    determining whether there is a picture rectangle for the page as specified in the page metadata; and
    responsive to an absence of the picture rectangle for the page, creating a new page in the document, and adding the image to the new page of the document.

6. The method of claim 1, wherein adding the image further comprises:
    determining whether there is a picture rectangle for the page as specified in the page metadata; and
    responsive to there being at least one picture rectangle for the page, adding the image to the page in place of the picture rectangle.

7. The method of claim 6 further comprising:
   determining whether the picture rectangle has been selected;
   responsive to the picture rectangle being selected, replacing the picture rectangle with the image.

8. The method of claim 6 further comprising:
   determining whether the picture rectangle has been selected;
   responsive to the picture rectangle not being selected, determining a first unfilled picture rectangle, and replacing the first unfilled picture rectangle with the image.

9. A computer program product comprising a non-transitory computer readable medium including a computer readable program, wherein the computer readable program when executed on a computer causes the computer to perform steps comprising:
   receiving a capture image command on a first computing device;
   capturing an image;
   determining a document and a page in the document being displayed by the first computing device, the page including text and being displayed by the first computing device for receiving annotation;
   determining page metadata stored within the page in the document;
   adding the image as a first annotation to a first location on the page in the document, the first location being determined based at least in part on the page metadata;
   determining a requirement for routing the document to a next computing device using the page metadata;
   determining whether the first annotation of the image to the first location on the page satisfies the requirement for routing the document to the next computing device based on annotation metadata, wherein the first annotation of the image to the first location on the page is marked with the annotation metadata;
   responsive to determining that the first annotation of the image to the first location on the page in the document satisfies the requirement for routing the document to the next computing device, determining a next step for the page in the document based at least in part on the page metadata, the next step being determined based at least in part on the page metadata; and
   routing the document to the next computing device to execute the next step on the page in the document, the next step being a second annotation to a second location on the page in the document.

10. The computer program product of claim 9, the steps further comprising:
    recording first computing device metadata that includes at least one of a time of day, a date, a location, a first computing device orientation and first computing device information; and
    adding the first computing device metadata to the page metadata.

11. The computer program product of claim 10, wherein adding the image includes adding the image to a same directory location as the document and adding the first computing device metadata to document metadata.

12. The computer program product of claim 9, wherein the first annotation of the image indicates a status of the page in the document.

13. The computer program product of claim 9, the steps further comprising:
    determining whether there is a picture rectangle for the page as specified in the page metadata; and
    responsive to an absence of the picture rectangle for the page, creating a new page in the document, and adding the image to the new page of the document.

14. The computer program product of claim 9, wherein adding the image further comprises:
    determining whether there is a picture rectangle for the page as specified in the page metadata; and
    responsive to there being at least one picture rectangle for the page, adding the image to the page in place of the picture rectangle.

15. The computer program product of claim 14, wherein adding the image further comprises:
    determining whether the picture rectangle has been selected;
    responsive to the picture rectangle being selected, replacing the picture rectangle with the image.

16. The computer program product of claim 14, wherein adding the image further comprises:
    determining whether the picture rectangle has been selected;
    responsive to the picture rectangle not being selected, determining a first unfilled picture rectangle, and replacing the first unfilled picture rectangle with the image.

17. A computing device for automatic attachment of an image to a document, the computing device comprising:
    one or more processors;
    an automatic capture module stored on a memory and executable by the one or more processors, the automatic capture module configured to receive a capture image command on the computing device, to capture the image, to determine the document and a page in the document being displayed by the computing device, the page including text and being displayed by the computing device for receiving annotation, to determine page metadata stored within the page in the document, to add the image as a first annotation to a first location on the page in the document, the first location being determined based at least in part on the page metadata, to determine a requirement for routing the document to a next computing device using the page metadata and to determine whether the first annotation of the image to the first location on the page satisfies the requirement for routing the document to the next computing device based on annotation metadata, wherein the first annotation of the image to the first location on the page is marked with the annotation metadata; and
    a workflow module stored on the memory and executable by the one or more processors, the workflow module coupled to the automatic capture module and configured to, responsive to determining that the first annotation of the image to the first location on the page in the document satisfies the requirement for routing the document to the next computing device, determine a next step for the page in the document, the next step being determined based at least in part on the page metadata and to route the document to the next computing device to execute the next step on the page in the document, the next step being a second annotation to a second location on the page in the document.

18. The apparatus of claim 17, wherein the first annotation of the image indicates a status of the page in the document.

19. The apparatus of claim 17, wherein the automatic capture module responsive to a stroke input, displays a picture rectangle in a visually distinct manner to indicate where the image will be inserted.

20. The apparatus of claim 17, wherein the automatic capture module responsive to a stroke input, displays an instruction box with a plurality of commands and associated check boxes.

\* \* \* \* \*